UNITED STATES PATENT OFFICE.

GEORGE ROTTENKOLBER, OF CORNWALL, ONTARIO, CANADA.

COMPOUNDS FOR PRESERVING BEER.

1,217,641.  Specification of Letters Patent.  Patented Feb. 27, 1917.

No Drawing.  Application filed July 21, 1916.  Serial No. 110,513.

*To all whom it may concern:*

Be it known that I, GEORGE ROTTENKOLBER, a subject of the King of Great Britain, residing at Cornwall, in the Province of Ontario, Canada, have invented certain new and useful Improvements in Compounds for Preserving Beer, of which the following is a specification.

This invention relates to a certain new and useful compound for preserving beer, of which the following is a specification, the compound consists of the following ingredients combined in the proportions stated viz:

| | |
|---|---|
| Potassium pyrosulfite (metabisulfite) $K_2S_2O_5$ | 13 oz. |
| Tartaric acid | 2 " |
| Sodium bicarbonate | 1 " |

These ingredients are to be thoroughly mixed. In using the above compound, the beer is fermented, being first placed in the storage vat, containing about twenty barrels of beer. Then sufficient of the compound to clarify one hundred and fifty barrels of beer is first put in twenty barrels of beer, then the vat is filled with beer until it contains one hundred and fifty barrels. In about 3 or 4 days the yeast becomes weak and settles in the bottom of the vat and the beer is then clear. After six days the beer becomes very brilliant in the vat. The potassium metasulfite weakens the yeast and causes it to settle at the bottom of the vat, thereby clarifying the beer. The process is not injurious in any way whatsoever, and it shortens the storage time of the beer. The clear beer is drawn off first and the residuum or waste materials at the bottom of the vat are drawn off afterward. The result of the application of the compound is that the beer can be put on the market quicker, the storage time being shortened and the beer keeps longer under different changes in temperature.

The mode of practising my invention is as follows: After the beer is fermented the quantity to be used is 2 pounds of the compound to 150 barrels of beer. Before the compound is put into the beer, the same is in a murky condition. The beer is run into a storage vat after the fermentation, and about 20 barrels are put in the storage vat first; then the compound is put in the storage vat. The compound is mixed with 2 gallons of water, having a temperature of 110 degrees Fahrenheit. The water dissolves the compound which is then poured into the vat and mixed with the beer.

In 3 or 4 days after the application of the compound, the beer is clear and in 6 or 7 days it is absolutely brilliant and ready for market. This does away with the old method of clarifying beer.

What I claim—

1. The herein described composition of matter consisting of potassium pyrosulfite, tartaric acid and sodium bicarbonate substantially as and for the purpose specified.

2. The herein described composition of matter for preserving beer, and preparing it for the market consisting of potassium pyrosulfite 13 oz. tartaric acid 2 oz. sodium bicarbonate 1 oz. substantially as described.

In testimony whereof I affix my signature in the presence of two witnesses.

GEORGE ROTTENKOLBER.

Witnesses:
G. R. TAGGART,
G. J. GOQO.